(12) United States Patent
Hwang

(10) Patent No.: US 11,951,963 B2
(45) Date of Patent: Apr. 9, 2024

(54) APPARATUS FOR CONTROLLING AUTONOMOUS VEHICLE BRAKE

(71) Applicant: HYUNDAI MOBIS Co., Ltd., Seoul (KR)

(72) Inventor: Woo Hyun Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 316 days.

(21) Appl. No.: 16/898,336

(22) Filed: Jun. 10, 2020

(65) Prior Publication Data

US 2020/0406869 A1     Dec. 31, 2020

(30) Foreign Application Priority Data

Jun. 27, 2019    (KR) .................... 10-2019-0076791

(51) Int. Cl.
*B60T 7/12*     (2006.01)

(52) U.S. Cl.
CPC .............. *B60T 7/12* (2013.01); *B60T 2240/00* (2013.01); *B60T 2250/00* (2013.01); *B60T 2270/402* (2013.01); *B60T 2270/413* (2013.01)

(58) Field of Classification Search
CPC .................................................. B60W 50/23
See application file for complete search history.

(56) References Cited

U.S. PATENT DOCUMENTS

| 11,046,330 | B1* | 6/2021 | Katzourakis | .......... | B60W 10/04 |
| 2018/0290642 | A1* | 10/2018 | Tschiene | ................ | B60T 8/885 |
| 2019/0168724 | A1* | 6/2019 | VandenBerg, III | ..... | B60T 8/171 |
| 2019/0248348 | A1* | 8/2019 | Ganzel | ................ | B60T 13/745 |
| 2020/0307534 | A1* | 10/2020 | Kurbasa | .................... | G01P 3/44 |

FOREIGN PATENT DOCUMENTS

| JP | H1189276 A | 3/1999 |
| KR | 10-2009-0062901 | 6/2009 |
| KR | 10-2010-0062146 | 6/2010 |
| KR | 10-2011-0059488 | 6/2011 |

OTHER PUBLICATIONS

Yune, Jong-woon, et al. Real-Time Control and Redundancy Mangement of Break-by-Wire System. The Korean Society of Automotive Engineers, Oct. 2000, www.dbpia.co.kr/journal/articleDetail?nodeId=NODE00526128.

* cited by examiner

*Primary Examiner* — Imran K Mustafa
(74) *Attorney, Agent, or Firm* — H.C. Park & Associates, PLC

(57) ABSTRACT

An apparatus for controlling an autonomous vehicle brake, including a first brake controller configured to control a brake module of an autonomous vehicle by receiving a deceleration command from an autonomous controller for controlling autonomous driving of the autonomous vehicle, and a second brake controller configured to control the brake module of the autonomous vehicle by receiving a deceleration command from the autonomous controller. The first and second brake controllers exchange monitoring information with each other in a predetermined communication manner to monitor an operation state, so that control of the brake module is transferred according to the result of monitoring.

9 Claims, 2 Drawing Sheets

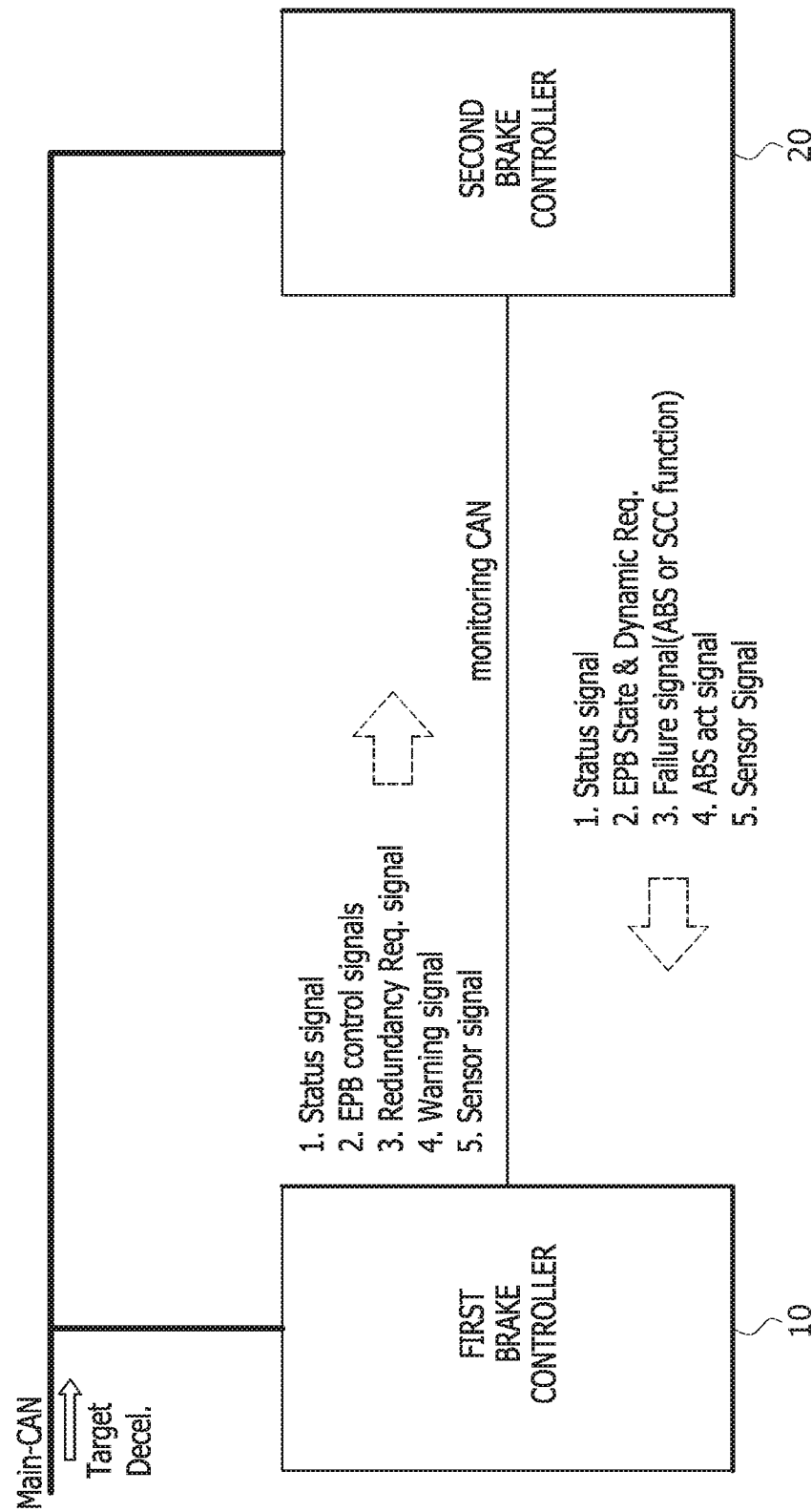

APPARATUS FOR CONTROLLING AUTONOMOUS VEHICLE BRAKE

CROSS-REFERENCE TO RELATED APPLICATION

This application claims priority from and the benefit of Korean Patent Application No. 10-2019-0076791, filed on Jun. 27, 2019, which is hereby incorporated by reference for all purposes as if set forth herein.

BACKGROUND

Field

Exemplary embodiments of the present invention relate to an apparatus for controlling an autonomous vehicle brake, and more particularly, to an apparatus for controlling an autonomous vehicle brake, in which a first brake controller and a second brake controller monitor an operation state therebetween by CAN communication in an autonomous vehicle so that the control of a brake module is transferred according to the result of monitoring.

Discussion of the Background

Autonomous driving is a key technology for the era of the future smart vehicle, and the level thereof is classified according to the degree of driver interference in driving control.

The National Highway Traffic Safety Administration (NHTSA) classifies the autonomous driving into a plurality of automation levels according to the degree of driver interference, and unmanned vehicles excluding driver interference are ultimately sought.

Particularly, among the automation levels, level 4 is autonomous driving only for a specific road or zone, whereas level 5 is fully autonomous driving without restriction to specific roads or zones.

In such automation level 4 or 5, since a driver completely transfers the driving control of an autonomous vehicle to the autonomous vehicle, it is difficult for the driver to intervene when an emergency occurs in a brake module, so that the system of the autonomous vehicle copes with this situation itself.

Accordingly, in the case of automation level 4 or 5, there is a need to secure redundancy for a braking system to ensure the reliability of the system.

An autonomous braking system of the prior art is disclosed in, for example, Korean Patent Application Publication No. 10-2011-0059488 (Jun. 2, 2011) entitled "Power Control System and Method for Vehicle".

The above information disclosed in this Background section is only for enhancement of understanding of the background of the invention and, therefore, it may contain information that does not constitute prior art.

SUMMARY

Exemplary embodiments of the present invention are directed to an apparatus for controlling an autonomous vehicle brake, in which a first brake controller and a second brake controller monitor an operation state therebetween by CAN communication in an autonomous vehicle so that the control of a brake module is transferred according to the result of monitoring.

Additional features of the inventive concepts will be set forth in the description which follows, and in part will be apparent from the description, or may be learned by practice of the inventive concepts.

An exemplary embodiment of the present invention provides an apparatus for controlling an autonomous vehicle brake, which includes a first brake controller configured to control a brake module of an autonomous vehicle by receiving a deceleration command from an autonomous controller for controlling autonomous driving of the autonomous vehicle, and a second brake controller configured to control the brake module of the autonomous vehicle by receiving a deceleration command from the autonomous controller. The first and second brake controllers exchange monitoring information with each other in a predetermined communication manner to monitor an operation state, so that control of the brake module is transferred according to the result of monitoring.

The first and second brake controllers may be connected in common to the autonomous controller through respective communication networks to receive the respective deceleration commands from the autonomous controller.

The first and second brake controllers may be connected to each other through a communication network.

The first and second brake controllers may switch the control depending on whether a communication error occurs therebetween.

When the communication error occurs between the first and second brake controllers, the second brake controller may acquire the control.

The apparatus may further include a sensor unit configured to detect a driving state of the autonomous vehicle to transmit the detected driving state to each of the first and second brake controllers independently.

The sensor unit may include a first wheel speed sensor for detecting a wheel speed of the autonomous vehicle to transmit the detected wheel speed to the first brake controller, and a second wheel speed sensor for detecting a wheel speed of the autonomous vehicle to transmit the detected wheel speed to the second brake controller.

The sensor unit may include a first inertial measurement unit (IMU) for detecting inertia for at least one of acceleration, rotation, and inclination of the autonomous vehicle to transmit the detected inertial to the first and second brake controllers, and a second IMU for detecting inertia for at least one of acceleration, rotation, and inclination of the autonomous vehicle to transmit the detected inertial to the second brake controller.

When a predetermined first control transfer condition is satisfied, the first brake controller may transfer the control to the second brake controller.

When a predetermined second control transfer condition is satisfied, the second brake controller may transfer the control to the first brake controller.

When both predetermined first and second control transfer conditions are satisfied, the first brake controller may operate in a degradation mode.

As is apparent from the above description, in the apparatus for controlling an autonomous vehicle brake, the first and second brake controllers monitor an operation state therebetween by CAN communication in the autonomous vehicle so that the control of the brake module is transferred according to the result of monitoring. Therefore, even when an emergency occurs in the brake module, it is possible to ensure the safe operation and to ensure the reliability of the braking system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a diagram illustrating an example of monitoring between first and second brake controllers using CAN communication according to the exemplary embodiment of the present invention.

DETAILED DESCRIPTION OF THE ILLUSTRATED EMBODIMENTS

Figure 1:
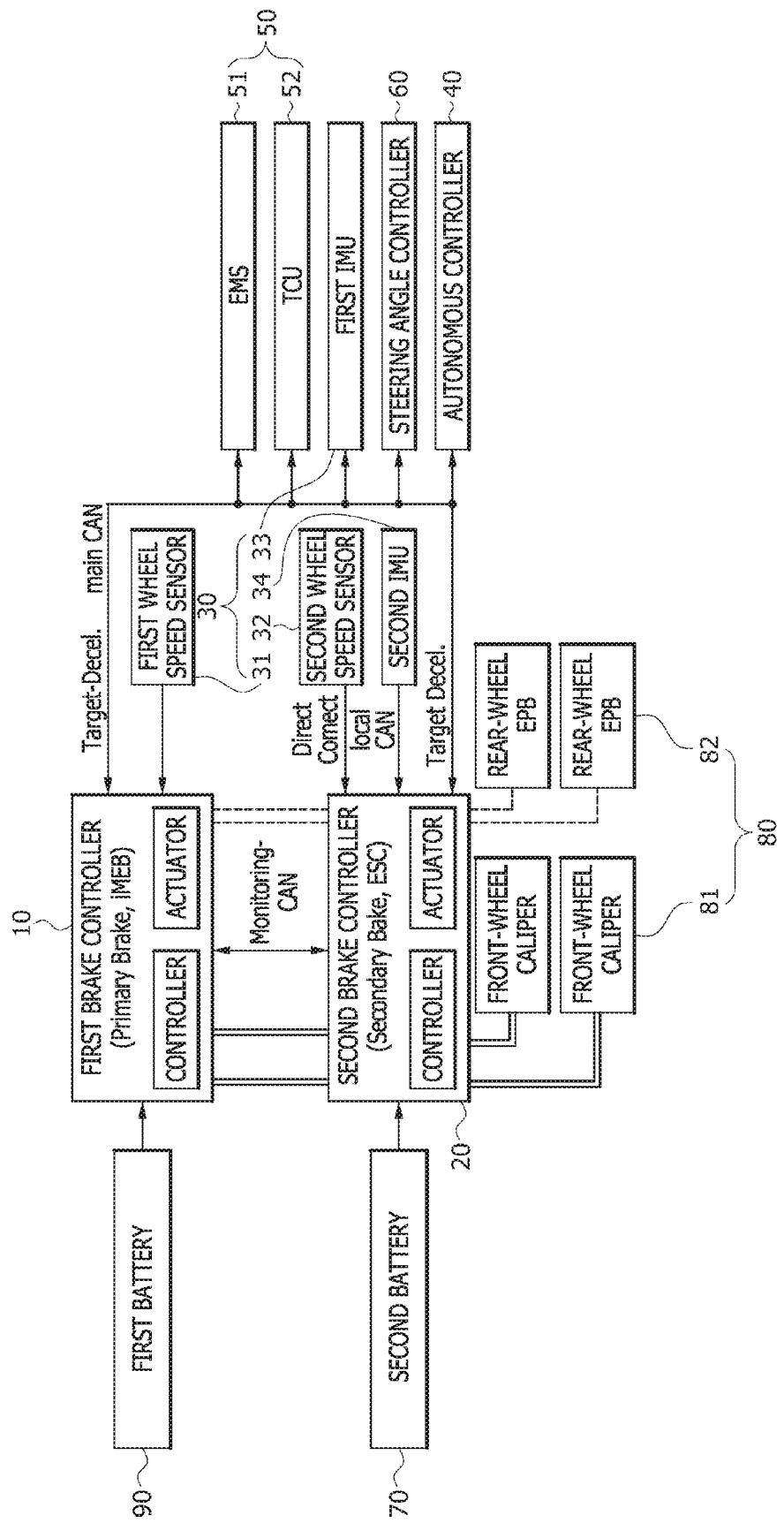
FIG. 1 is a block diagram illustrating an apparatus for controlling an autonomous vehicle brake according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for controlling an autonomous vehicle brake will be described in detail with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the invention and may change depending on the intention or practice of a user or an operator. Therefore, these terms should be defined based on the overall disclosures set forth herein.

FIG. 1 is a block diagram illustrating an apparatus for controlling an autonomous vehicle brake according to an exemplary embodiment of the present invention. FIG. 2 is a diagram illustrating an example of monitoring between first and second brake controllers using CAN communication according to the exemplary embodiment of the present invention.

Referring to FIG. 1, the apparatus for controlling an autonomous vehicle brake according to an exemplary embodiment of the present invention includes a first brake controller 10, a second brake controller 20, a sensor unit 30, an autonomous controller 40, and a vehicle driving control module 50.

A first battery 90 supplies the first brake controller 10 with electric power for the operation of a brake module 80.

A second battery 70 supplies the second brake controller 20 with electric power for the operation of the brake module 80.

Although the first and second batteries 90 and 70 are exemplarily described as being provided independently in the present exemplary embodiment, the technical scope of the present invention is not limited thereto. The present invention may include a single battery to supply electric power to each of the first and second brake controllers 10 and 20 from the battery.

The autonomous controller 40 controls autonomous driving of an autonomous vehicle. The autonomous controller 40 may control the autonomous vehicle to travel to a destination using a precise map without operating a steering wheel, an accelerator pedal, a brake pedal, and the like by a driver.

To this end, the autonomous controller 40 controls the operation of the autonomous vehicle by controlling the first brake controller 10, the second brake controller 20, a steering angle controller 60, and the vehicle driving control module 50, such as an engine management system (EMS) 51 or a transmission control unit (TCU) 52.

In this case, the autonomous controller 40 operates organically with at least one of a blind spot detection (BSD) to warn of danger of accidents occurring in a blind spot, a forward collision warning system (FWC) to warn occupants, including a driver, of a collision with a forward vehicle, an advanced emergency braking system (AEBS) to automatically decelerate according to the possibility of collision with a forward vehicle, a smart cruise control (SCC) to cruise while automatically accelerating and decelerating in response to a preceding vehicle, a lane departure warning system (LDWS) to warn occupants, including a driver, of a lane departure, a lane keeping assist system (LKAS) to prevent a departure from a lane on which a vehicle is currently traveling, and a rear-end collision warning system (RCW) to warn occupants, including a driver, of a collision with a rear vehicle. Each such vehicle control system is not limited to the above exemplary embodiment.

The autonomous controller 40 is connected to the vehicle driving control module 50, the first brake controller 10, the second brake controller 20, and the steering angle controller 60 through a communication network, for example, a main controller area network (CAN) to transmit various control commands for autonomous driving control to at least one of the vehicle driving control module 50, the first brake controller 10, the second brake controller 20, and the steering angle controller 60 through the main CAN.

In particular, when a vehicle travels at an automation level 4 or 5, the autonomous controller 40 is connected in common to the first and second brake controllers 10 and 20 through the main CAN to transmit a deceleration command (Target Decel.) to each of the first and second brake controllers 10 and 20.

In this case, one of the first and second brake controllers 10 and 20 controls the brake module 80 according to whether it holds the control of the brake module 80. A detailed description thereof will be given later.

The vehicle driving control module 50 controls the driving of the autonomous vehicle in response to the control signal from the autonomous controller 40. The vehicle driving control module 50 includes the EMS 51 and the TCU 52.

The EMS 51 controls an opening angle of a throttle valve (not illustrated) by controlling an electronic throttle actuator (not illustrated) of the TCU 52 in response to the control signal received from the autonomous controller 40, thereby generating a driving force required for driving of the autonomous vehicle and controlling the speed of the autonomous vehicle.

The TCU 52 allows for shifting gear to a desired shift range in response to the control signal received from the autonomous controller 40.

The sensor unit 30 detects a driving state of the autonomous vehicle to transmit it independently to each of the first and second brake controllers 10 and 20.

The sensor unit 30 includes a first wheel speed sensor (WSS) 31, a second wheel speed sensor 32, a first inertial measurement unit (IMU) 33, and a second IMU 34.

The first wheel speed sensor 31 detects a wheel speed of the autonomous vehicle. The first wheel speed sensor 31 is directly connected to the first brake controller 10 to transmit the wheel speed of the autonomous vehicle to the first brake controller 10.

The second wheel speed sensor 32 detects a wheel speed of the autonomous vehicle. The second wheel speed sensor 32 is directly connected to the second brake controller 20 to transmit the wheel speed of the autonomous vehicle to the second brake controller 20.

That is, the first and second wheel speed sensors 31 and 32 are provided independently to transmit the wheel speed of the autonomous vehicle to each of the first and second brake controllers 10 and 20. Accordingly, when an error occurs in one of the first and second brake controllers 10 and 20, the brake controller (first brake controller 10 or second brake controller 20) currently holding the control may directly receive the wheel speed of the autonomous vehicle from one of the first and second wheel speed sensors 31 and 32 directly connected thereto. Therefore, the brake controller currently holding the control may control the brake module 80 based on the corresponding wheel speed.

Although the first and second wheel speed sensors 31 and 32 are exemplarily described as being provided independently in the present exemplary embodiment, the inventive concepts are not limited thereto. The present invention may include a single wheel speed sensor to transmit a wheel speed to the first and second brake controllers 10 and 20 simultaneously and in parallel.

The first IMU 33 detects inertia for acceleration, rotation, inclination, etc. of the autonomous vehicle. The first IMU 33 is connected to the first and second brake controllers 10 and 20 through the main CAN to transmit the inertia of the autonomous vehicle to each of the first and second brake controllers 10 and 20 through the main CAN.

The second IMU 34 detects inertia for acceleration, rotation, inclination, etc. of the autonomous vehicle. The second IMU 34 is connected to the second brake controller 20 through a communication network, for example, a local CAN to transmit the inertia of the autonomous vehicle to the first brake controllers 10 through the local CAN.

That is, since the second IMU 34 is additionally provided in the first IMU 33, the second IMU 34, separately from the first IMU 33, transmits the inertia of the autonomous vehicle to the second brake controller 20 even when an error occurs in the first brake controller 10 so that the second brake controller 20 holds the control. Therefore, the second brake controller 20 may control the brake module 80 based on the inertia of the autonomous vehicle transmitted from the second IMU 34.

The brake module 80 is configured to brake the autonomous vehicle, and includes a front-wheel caliper 81 and a rear-wheel electronic parking brake (EPB) 82. Each of the front-wheel caliper 81 and the rear-wheel EPB 82 brakes the vehicle by operating in response to the control signal of one of the first and second brake controllers 10 and 20.

The first brake controller 10 is a primary brake controller. When a deceleration command is input to the first brake controller 10 from the autonomous controller 40, the first brake controller 10 controls the brake module 80 based on the wheel speed input from the first wheel speed sensor 31 or the inertia of the autonomous vehicle input from the first IMU 33 to control the speed of the autonomous vehicle. The first brake controller 10 preferentially holds the control of the brake module.

The second brake controller 20 is a secondary brake controller. When a deceleration command is input to the second brake controller 20 from the autonomous controller 40, the second brake controller 20 controls the brake module 80 based on the wheel speed input from the second wheel speed sensor 32 or the inertia of the autonomous vehicle input from the second IMU 34 to control the speed of the autonomous vehicle.

Referring to FIG. 2, the first and second brake controllers 10 and 20 receive a deceleration command in common from the autonomous controller 40 through the main CAN, and one of them controls the brake module 80 according to whether to currently hold the control of the brake module 80.

For example, when the first brake controller 10 holds the control of the brake module 80, the first brake controller 10 controls the brake module 80 based on the wheel speed input from the first wheel speed sensor 31 or the inertia of the autonomous vehicle input from the first IMU 33. When the second brake controller 20 holds the control of the brake module 80, the second brake controller 20 controls the brake module 80 based on the wheel speed input from the second wheel speed sensor 32 or the inertia of the autonomous vehicle input from the second IMU 34.

The first and second brake controllers 10 and 20 are connected to each other through a communication network, for example, a monitoring CAN. Accordingly, when the first and second brake controllers 10 and 20 control the brake module 80 in response to the deceleration command, they may exchange monitoring information with each other through the monitoring CAN.

For example, when the first brake controller 10 holds the control of the brake module 80 and controls the brake module 80, the second brake controller 20 receives the monitoring information of the first brake controller 10 through the monitoring CAN to monitor the operation state of the first brake controller 10. On the other hand, when the second brake controller 20 holds the control of the brake module 80 and controls the brake module 80, the first brake controller 10 receives the monitoring information of the second brake controller 20 through the monitoring CAN to monitor the operation state of the second brake controller 20.

In this case, the first brake controller 10 may transmit at least one of a status signal, EPB control signals, a redundancy Req. signal, a warning signal, and a sensor signal to the second brake controller 20. That is, when the first brake controller 10 holds the control of the brake module 80 and controls the brake module 80, the first brake controller 10 transmits its status signal, EPB control signals, signal, warning signal, and sensor signal to the second brake controller 20. When the second brake controller 20 is in an error state with the control of the brake module 80 held, the first brake controller 10 transmits the redundancy Req. to the second brake controller 20 to make a request for and take over the control of the brake module 80 therefrom. The signals transmitted from the first brake controller 10 to the second brake controller 20 are not limited to the above exemplary embodiment.

First control transfer conditions for the first brake controller 10 to transfer the control of the brake module 80 to the second brake controller 20 may include a failure of a controller or an actuator in the first brake controller 10. For example, the first control transfer conditions may include a failure of one or more wheel speed sensors (WSSs), a failure of a valve relay in an electronic control unit (ECU), an open or short failure of an electronic stability control system (ESC) valve, a motor relay fuse open failure, a failure of a motor power FET pre-driver, a time-out failure of major CAN messages (a yaw rate sensor (YRS), a central gateway (CGW), a speed sensor (SPS), etc.), a major signal failure of a smart cruise Control (SCC), a hydraulic control unit (HCU), or an YRS, a failure when supply voltage is below or above reference voltage, a failure of a micro control unit (MCU) or a watchdog, a variant coding error, an abnormal operation of an anti-lock brake system (ABS) or a vehicle dynamic control (VDC), and an open or short failure of a brake light signal (BLS) relay. In this case, when at least one of the first control transfer conditions is satisfied, the first brake controller 10 transfers the control to the second brake controller 20. The first control transfer conditions are not limited to the above exemplary embodiment.

On the other hand, the second brake controller 20 may transmit at least one of a status signal, an EPB state & dynamic Req., a failure signal (ABS or SCC function), an ABS act signal, and a sensor signal to the first brake controller 10. That is, when the second brake controller 20 holds the control of the brake module 80 and controls the brake module 80, the second brake controller 20 transmits its status signal, failure signal (ABS or SCC function), ABS act signal, and sensor signal to the first brake controller 10. When the first brake controller 10 is in an error state with the control of the brake module 80 held, the second brake controller 20 transmits the EPB state & dynamic Req. to the first brake controller 10 to make a request for and take over the control of the brake module 80 therefrom. The signals transmitted from the second brake controller 20 to the first brake controller 10 are not limited to the above exemplary embodiment.

Second control transfer conditions for the second brake controller 20 to transfer the control of the brake module 80 to the first brake controller 10 may include a failure of a controller or an actuator in the second brake controller 20. For example, the second control transfer conditions may include at least one of a failure of one or more wheel speed sensors (WSSs), a failure of a master pressure sensor, a time-out failure of an Ax pressure signal, an SCC time-out or signal error failure, a failure when supply voltage is below or above reference voltage, a failure of an MCU or a watchdog, an open/short failure of a valve or a motor, and a failure of EPB hardware. In this case, when at least one of the second control transfer conditions is satisfied, the second brake controller 20 transfers the control to the first brake controller 10. The second control transfer conditions are not limited to the above exemplary embodiment.

In the case where the first brake controller 10 is in an error state so that the first brake controller 10 transfers the control to the second brake controller 20, if the second brake controller 20 is also in an error state, the first brake controller 10 performs a degradation mode in which the brake module 80 is mechanically operated to the degree that the driver depresses a brake pedal.

The first and second brake controllers 10 and 20 are interconnected through the monitoring CAN as described above. When a CAN communication error, for example, an ECAN (DCAN) time-out of 70 ms or more, occurs between the first and second brake controllers 10 and 20, the first brake controller 10 transfers the control of the brake module 80 to the second brake controller 20.

The steering angle controller 60 controls the angle of the steering wheel of the autonomous vehicle in response to the control signal from the autonomous controller 40.

As described above, in the apparatus for controlling an autonomous vehicle brake according to an exemplary embodiment of the present invention, the first and second brake controllers 10 and 20 monitor the operation state therebetween by the CAN communication in the autonomous vehicle so that the control of the brake module 80 is transferred according to the result of monitoring. Therefore, even when an emergency occurs in the brake module 80, it is possible to ensure the safe operation and to ensure the reliability of the braking system.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:

1. An apparatus for controlling an autonomous vehicle brake, comprising:
  a first brake controller configured to control a brake module of an autonomous vehicle by receiving a deceleration command from an autonomous controller for controlling autonomous driving of the autonomous vehicle;
  a second brake controller configured to control the brake module of the autonomous vehicle by receiving a deceleration command from the autonomous controller; and
  a sensor unit configured to detect a driving state of the autonomous vehicle to transmit the detected driving state to each of the first and second brake controllers independently,
  wherein:
  the sensor unit comprises:
    a first wheel speed sensor directly connected to the first brake controller for detecting a wheel speed of the autonomous vehicle to transmit the detected wheel speed to the first brake controller;
    a second wheel speed sensor directly connected to the second brake controller for detecting a wheel speed of the autonomous vehicle to transmit the detected wheel speed to the second brake controller;

a first inertial measurement unit (IMU) for detecting inertia for at least one of acceleration, rotation, and inclination of the autonomous vehicle to transmit the detected inertial to the first and second brake controllers; and a second IM U for detecting inertia for at least one of acceleration, rotation, and inclination of the autonomous vehicle to transmit the detected inertial only to the second brake controller to enable the second brake controller to maintain control of the brake module of the autonomous vehicle when an error occurs in the first brake controller; and the first and second brake controllers are configured to exchange monitoring information with each other in a predetermined communication manner to monitor an operation state, so that control of the brake module is transferred according to the result of monitoring.

2. The apparatus according to claim 1, wherein the first and second brake controllers are connected in common to the autonomous controller through respective communication networks to receive the respective deceleration commands from the autonomous controller.

3. The apparatus according to claim 1, wherein the first and second brake controllers are connected to each other through a communication network.

4. The apparatus according to claim 1, wherein the first and second brake controllers switch the control depending on whether a communication error occurs therebetween.

5. The apparatus according to claim 4, wherein when the communication error occurs between the first and second brake controllers, the second brake controller acquires the control.

6. The apparatus according to claim 1, wherein when a predetermined first control transfer condition is satisfied, the first brake controller transfers the control to the second brake controller.

7. The apparatus according to claim 6, wherein when a predetermined second control transfer condition is satisfied, the second brake controller transfers the control to the first brake controller.

8. The apparatus according to claim 7, wherein when both predetermined first and second control transfer conditions are satisfied, the first brake controller operates in a degradation mode.

9. The apparatus according to claim 8, wherein the degradation mode is defined as a mode in which the brake module is mechanically operated by depression of a brake pedal by a driver of the autonomous vehicle.

* * * * *